United States Patent
Guo et al.

(12)

(10) Patent No.: US 11,150,547 B2
(45) Date of Patent: Oct. 19, 2021

(54) LIGHT SOURCE SYSTEM WITH BEAMSPLITTER, PROJECTION DEVICE OF SAME, AND LIGHTING DEVICE THEREOF

(71) Applicant: Appotronics Corporation Limited, Shenzhen (CN)

(72) Inventors: Zuqiang Guo, Shenzhen (CN); Fei Hu, Shenzhen (CN); Yi Li, Shenzhen (CN)

(73) Assignee: Appotronics Corporation Limited, Shenzhen (CN)

(*) Notice: Subject to any disclaimer, the term of this patent is extended or adjusted under 35 U.S.C. 154(b) by 270 days.

(21) Appl. No.: 16/099,417

(22) PCT Filed: Apr. 21, 2017

(86) PCT No.: PCT/CN2017/081373
§ 371 (c)(1),
(2) Date: Nov. 6, 2018

(87) PCT Pub. No.: WO2017/198034
PCT Pub. Date: Nov. 23, 2017

(65) Prior Publication Data
US 2020/0319539 A1    Oct. 8, 2020

(30) Foreign Application Priority Data

May 19, 2016 (CN) .......................... 201610338099.5

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 21/2066* (2013.01); *G03B 21/2073* (2013.01)

(58) Field of Classification Search
CPC .............. G03B 21/204; G03B 21/2066; G03B 21/2073; G03B 21/208; G02B 26/008
See application file for complete search history.

(56) References Cited

U.S. PATENT DOCUMENTS 3,998,524 A * 12/1976 Hubby, Jr. ............ G02B 27/283
                                                     359/489.09
5,579,138 A * 11/1996 Sannohe ............... G02B 27/283
                                                     348/E9.027
(Continued)

FOREIGN PATENT DOCUMENTS

CN    201576164 U  *  9/2010
CN    201576164 U     9/2010
(Continued)

OTHER PUBLICATIONS

Maeda, Light Source Device and Projection Type Video Display Device, JP 2014142524 A, 2014 https://worldwide.espacenet.com/patent/search/family/051423850/publication/JP2014142524A (Year: 2014).*

(Continued)

*Primary Examiner* — Rajarshi Chakraborty
*Assistant Examiner* — Michael Chiang
(74) *Attorney, Agent, or Firm* — Seed IP Law Group LLP (57) ABSTRACT

A light source system includes an excitation light unit, a spectral filter unit, a scattering unit, and an excited-light unit. The excitation light unit is configured to emit excitation light. In an embodiment, the spectral filter unit reflects a portion of the excitation light to the scattering unit, the scattering unit scatters the same to generate a first light and a second light, and the spectral filter unit transmits the second light. The spectral filter unit also transmits another part of the excitation light to the excited-light unit, the excited-light unit emits excited light under the illumination thereof, and the spectral filter unit reflects the excited light, (Continued)

so that the spectral filter unit merges and emits the transmitted second light and the reflected excited light. The excitation light is thus split into two paths at the spectral filter unit, and finally emits light by combining excitation light and excited light.

20 Claims, 7 Drawing Sheets

(56) References Cited

U.S. PATENT DOCUMENTS

| | | | | |
|---|---|---|---|---|
| 2004/0227994 | A1* | 11/2004 | Ma | G02B 27/283 |
| | | | | 359/485.02 |
| 2010/0123854 | A1* | 5/2010 | Adachi | G02B 6/0056 |
| | | | | 349/61 |
| 2012/0140183 | A1* | 6/2012 | Tanaka | G03B 21/28 |
| | | | | 353/20 |
| 2012/0242912 | A1 | 9/2012 | Kitano | |
| 2015/0153020 | A1* | 6/2015 | Akiyama | H04N 9/3194 |
| | | | | 353/20 |
| 2015/0301438 | A1* | 10/2015 | Akiyama | G03B 21/2033 |
| | | | | 353/20 |
| 2016/0011497 | A1* | 1/2016 | Akiyama | G03B 21/204 |
| | | | | 353/31 |

FOREIGN PATENT DOCUMENTS

| | | |
|---|---|---|
| CN | 204028554 U | 12/2014 |
| CN | 105116676 A | 12/2015 |
| CN | 105319819 A | 2/2016 |
| CN | 205910480 U | 1/2017 |
| JP | 2014142524 A * | 8/2014 |

OTHER PUBLICATIONS

Chen, Micro projector used for 3D display CN201576164U, 2010 https://worldwide.espacenet.com/patent/search/family/042696040/publication/CN201576164U (Year: 2010).*

International Search Report for Application No. PCT/CN2017/081373 dated May 23, 2017, 3 pages.

* cited by examiner

LIGHT SOURCE SYSTEM WITH BEAMSPLITTER, PROJECTION DEVICE OF SAME, AND LIGHTING DEVICE THEREOF

BACKGROUND

Technical Field

The present application relates to the field of projection and illumination, and specifically relates to a light source system, a projection device of the same, and a lighting device thereof.

Description of the Related Art

At present, using a laser light source is becoming increasingly prevalent in the field of projection and illumination. Having the advantages of high energy density and small optical expansion, the laser light source has gradually replaced light bulbs and LEDs as light sources in the field of high-luminance light sources. The design solution of using a blue laser as an excitation light source to excite yellow phosphor to produce yellow light and then merging the two different lights into white light has become a mainstream application because of excellent luminous efficiency and stability. In a common solution of the prior art, two independent light sources are adopted. In one path, the blue laser light emitted by the light source is relayed and delivered to the yellow phosphor, so that the blue laser excites the yellow phosphor to produce yellow fluorescent light. In the other path, the blue light laser emitted by the light source is merged with the yellow fluorescent light to form white light after passing through a relay system. This solution of the prior art leads to an overly complicated system structure, a large product size, an excessive arrangement of optical components, and high costs, making it difficult to create miniature products.

BRIEF SUMMARY

According to an aspect of the present disclosure, a light source system comprising an excitation light unit, a spectral filter unit, a scattering unit, and an excited-light unit is provided.

The excitation light unit is configured to emit excitation light to the spectral filter unit. The spectral filter unit is configured to reflect or transmit a portion of the excitation light to the scattering unit. The scattering unit is configured to scatter the portion of the excitation light so as to produce a first light having a first polarization state and a second light having a second polarization state and emit the first light and second light to the spectral filter unit; the spectral filter unit transmits or reflects the second light from the scattering unit. The spectral filter unit is further configured to transmit or reflect another portion of the excitation light to the excited-light unit, and the excited-light unit produces excited light under illumination of the another portion of the excitation light and emits the excited light to the spectral filter unit. The spectral filter unit further reflects or transmits the excited light from the excited-light unit, so that the spectral filter unit merges and emits the second light transmitted or reflected therefrom and the excited light reflected or transmitted therefrom.

According to a second aspect of the present disclosure, a projection device is provided, and the above-mentioned light source system is employed as a light source for the projection device.

According to a third aspect of the present disclosure, a lighting device is provided, and the above-mentioned light source system is employed as a light source for the lighting device.

In the present disclosure, excitation light produced by an excitation light unit is divided into two paths at the spectral filter unit, and is emitted by merging the excitation light and the excited light. Since only one laser light source is needed, the design of the optical path structure is greatly simplified. The present disclosure has important practical application values in the fields of beam illumination and the 3LCD projection technology.

DETAILED DESCRIPTION

In what follows, the present disclosure is further described in detail by using specific embodiments with reference to the accompanying drawings.

Embodiment 1

Figure 1:
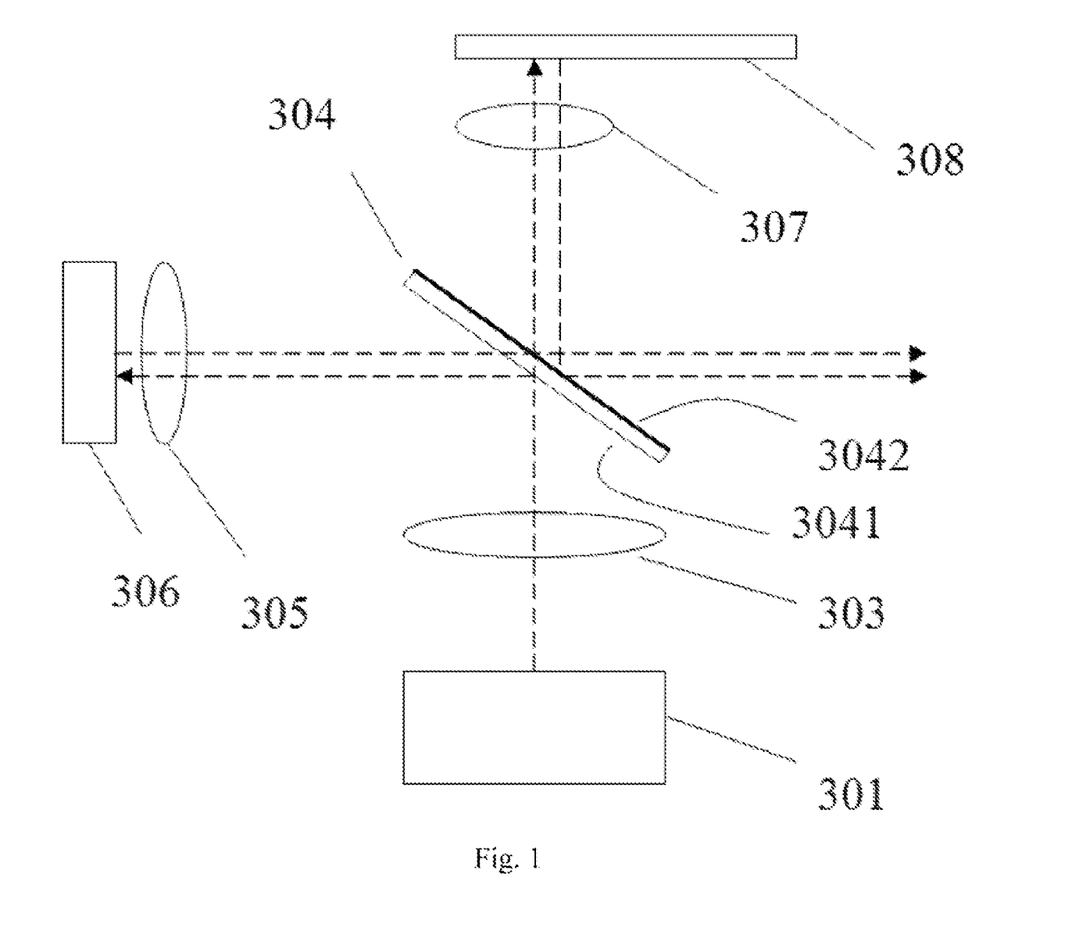
FIG. 1 is a schematic structural diagram of a light source system structure according to Embodiment 1 of the present disclosure.

As shown in FIG. 1, a light source system in this embodiment includes an excitation light unit, a spectral filter unit, a scattering unit, and an excited-light unit.

Specifically, the excitation light unit includes a laser light source 301 and a relay lens 303. The laser light source 301 is preferably a blue light laser diode (LD), and the relay lens 303 is located on an optical path through which the laser from the laser light source 301 propagates.

The spectral filter unit includes at least one beamsplitter 304, which is specifically one piece in this embodiment and is obliquely disposed on the optical path of the laser propagating after the relay lens 303. The beamsplitter 304 has two surfaces, wherein the surface facing the excitation light unit and the scattering unit is a first surface 3041, and the surface of the beamsplitter 304 facing the excited-light unit is a second surface 3042. In at least one implementation, the second surface 3042 of the beamsplitter is coated with a film (AR film) for transmitting P-light and S-light and reflecting the excited light, and the first surface 3041 is not coated with a film.

The scattering unit includes a first collective lens 305 and a diffuser 306. The excited-light unit includes a second collective lens 307 and a phosphor device (that is, a rotation reflective color wheel) 308.

The principle of the optical path of the light source system is described in detail below.

The laser light source 301 emits linearly polarized light, i.e., S-light. The relay lens 303 performs light processing on the S-light (for example, processing such as homogenization, shaping, convergence, compression) so as to emit the S-light to the spectral filter unit as excitation light. The relay lens 303 may be used to improve energy density uniformity of spots incident on the color wheel 308, so as to improve the light conversion efficiency of the color wheel 308. In other implementations, the laser light source 301 may also emit P-light.

The first surface 3041 of the beamsplitter reflects a portion of the S-light to the scattering unit (for example, if the reflectance of the first surface 3041 of the beamsplitter is 9% regarding the S-light, then 9% of the S-light is reflected to the scattering unit). The first collective lens 305 converges the portion of the S-light reflected by the spectral filter unit to the diffuser 306, and the diffuser 306 performs Lambert scattering on the portion of the S-light so as to produce S-light and P-light with the same proportion; and the S-light and P-light are emitted to the beamsplitter 304 via the first collective lens 305. The beamsplitter 304 transmits the P-light and reflects the S-light. In other implementations, when a specific diffuser is selected as desired, the P-light and the S-light produced by the diffuser 306 can have different proportions.

The first surface 3041 and the second surface 3042 of the beamsplitter also transmit another portion of the S-light to the excited-light unit. The second collective lens 307 converges the another portion of the S-light transmitted by the spectral filter unit to the color wheel 308. The color wheel 308 has a yellow phosphor material and produces excited light under illumination of the another portion of the S-light, i.e., the yellow fluorescent light, which is emitted to the spectral filter unit via the second collective lens 307. The second surface 3042 of the beamsplitter reflects the yellow fluorescent light of the excited-light unit.

Therefore, the spectral filter unit merges and emits the transmitted P-light and the reflected yellow fluorescent light. Because the P-light is a blue light, the P-light is then merged with the yellow light to form a uniform white light for emitting.

In other implementations, the laser emitted by the laser light source 301 is not limited to the blue laser and is not limited to one color. As long as the light transmitted by the spectral filter unit and the fluorescent light reflected by the spectral filter unit are merged into a white light, the color wheel may produce light with other colors besides the yellow fluorescent light according to selection of a fluorescent material. According to actual needs, the light transmitted by the spectral filter unit and the fluorescent light reflected by the spectral filter unit may also be merged into light of other colors.

Embodiment 2

Figure 2:
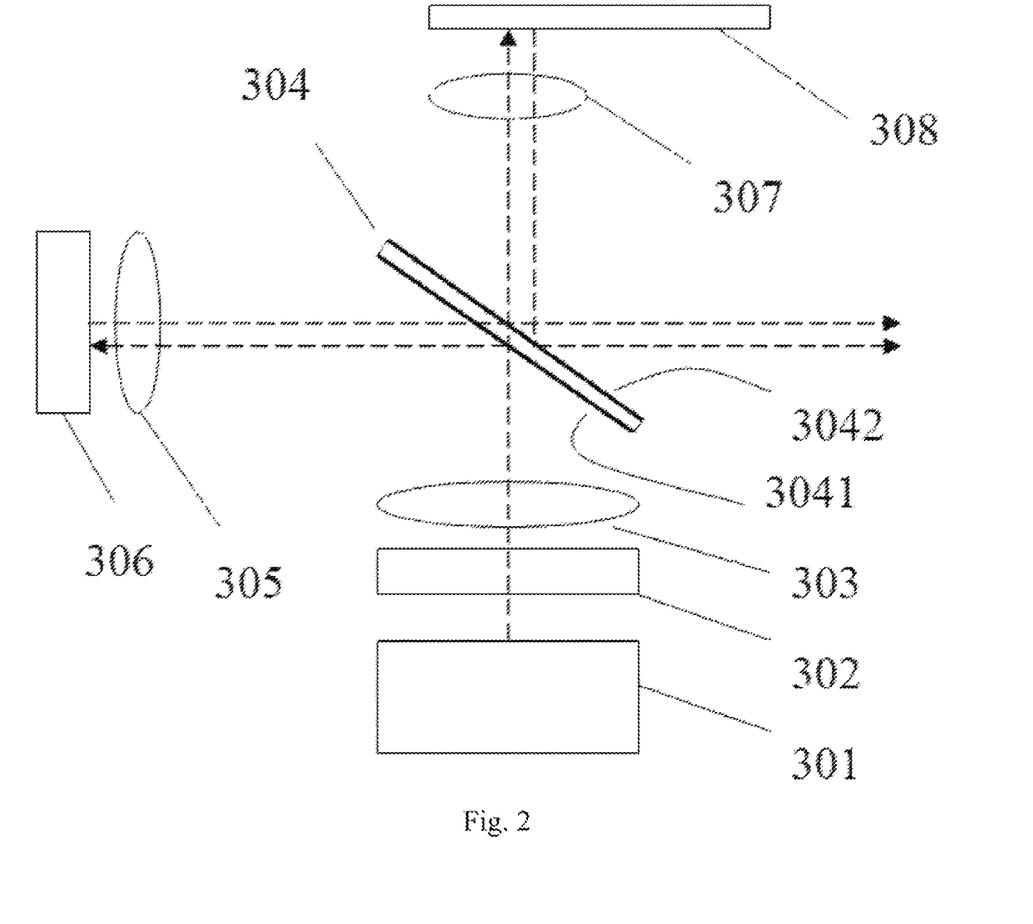
FIG. 2 is a schematic structural diagram of a light source system structure according to Embodiment 2 of the present disclosure.

The difference between Embodiment 2 and Embodiment 1 is that the excitation light unit in this embodiment further includes a liquid crystal device 302 disposed on an optical path between the laser light source 301 and the relay lens 303. The liquid crystal device 302 is adjusted so that the liquid crystal molecules are deflected by a certain angle, and a polarization direction of the light passing through the liquid crystal device 302 is also rotated by a certain angle. The larger the deflection angle of the liquid crystal molecules, the larger the degree of deflection of the polarization direction of the light. Therefore, the liquid crystal device 302 is mainly used for adjusting the polarization state of the laser.

In this embodiment, the laser emitted by the laser light source 301 passes through the liquid crystal device 302 to form S-light in a first polarization state and P-light in a second polarization state which have a specific proportional relationship, and is emitted to the spectral filter unit via the relay lens 303. For example, if a rotation angle of liquid crystal molecules is $\alpha$, the S-light emitted through the liquid crystal device 302 is $I\cos(\alpha)$, and the P-light is $I\sin(\alpha)$, where I is the laser intensity. A person skilled in the art may adjust the deflection angle of the liquid crystal device 302 according to the requirements in emitting the white light.

Another difference between this embodiment and Embodiment 1 is that the first surface 3041 of the beamsplitter of this embodiment is coated with a film having the PBS (polarization beam splitter) function, i.e., reflecting the S-light and transmitting the P-light. The second surface 3042 is coated with a film for transmitting the P-light and reflecting the excited light.

Therefore, the first surface 3041 of the beamsplitter reflects the S-light from the excitation light unit to the scattering unit. The scattering unit performs Lambert scattering on the S-light so as to produce S-light and P-light with the same proportion and emit the S-light and the P-light to the spectral filter unit. The first surface 3041 and the second surface 3042 of the beamsplitter transmit the P-light, and the S-light is reflected by the first surface 3041.

The first surface 3041 and the second surface 3042 of the beamsplitter transmit the P-light from the excitation light unit to the excited-light unit, and the excited-light unit produces yellow fluorescent light under illumination of the P-light and emits it to the spectral filter unit. The second surface 3042 of the beamsplitter reflects the yellow fluorescent light.

Therefore, the spectral filter unit merges the transmitted P-light and the reflected yellow fluorescent light into white light and emits the white light.

Embodiment 3

Figure 3:
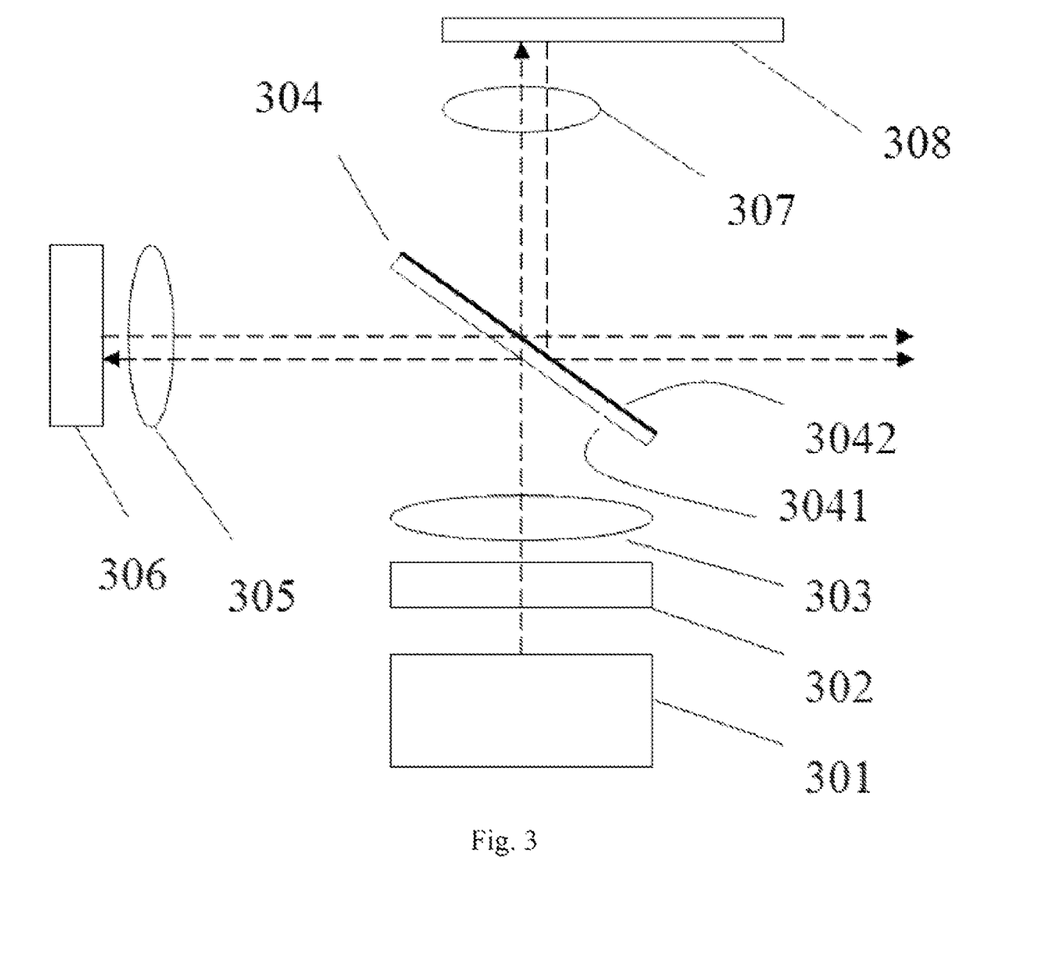
FIG. 3 is a schematic structural diagram of a light source system structure according to Embodiment 3 of the present disclosure.

As shown in FIG. 3, a light source system in this embodiment also includes a laser light source 301, a relay lens 303, a beamsplitter 304, a first collective lens 305, a diffuser 306, a second collective lens 307, and a reflective color wheel 308.

The difference between Embodiment 1 and Embodiment 3 is that the excitation light unit of this embodiment further includes a liquid crystal device 302 disposed between the laser light source 301 and the relay lens 303. The second surface 3042 of the beamsplitter in this embodiment is coated with a film for transmitting P-light and reflecting excited light. The first surface 3041 is not coated with a film. According to the uncoated glass property, the first surface 3041 of the beamsplitter may reflect the S-light and the P-light at different reflectances respectively. In this embodiment, the reflectance of the first surface 3041 of the beamsplitter is 9% regarding the S-light and 2% regarding the P-light.

The principle of an optical path of the light source system is described in detail as below.

The laser light source 301 emits blue laser, and the laser forms, after passing through the liquid crystal device 302, S-light and P-light that have a specific proportional relationship. The S-light and the P-light are emitted to the spectral filter unit as excitation light after passing through the relay lens 303.

The proportion of the S-light and the P-light changes when the liquid crystal device 302 is adjusted, and a changing range of the reflectance of the excitation light on the first surface 3041 of the beamsplitter is 2% to 9%.

The scattering unit performs Lambert scattering on the S-light and the P-light reflected by the beamsplitter 304, so as to produce S-light and P-light with the same proportion and emit the S-light and the P-light to the spectral filter unit. For the S-light and the P-light, 9% of the S-light and 2% of the P-light are reflected at the first surface 3041; the average reflectance is 5.5% and the transmittance is 94.5%. The first surface 3041 and the second surface 3042 of the beamsplitter transmit 94.5% of the light; that is, 94.5% of the excitation light reflected by the beamsplitter 304 is utilized again.

The first surface 3041 and the second surface 3042 of the beamsplitter also transmit 91% of the S-light and 98% of the P-light in the excitation light from the excitation light unit to the excited-light unit. The excited-light unit produces yellow fluorescent light under illumination of the excitation light and emits the yellow fluorescent light to the spectral filter unit, and the second surface 3042 of the beamsplitter reflects the yellow fluorescent light.

Therefore, the spectral filter unit merges the transmitted S-light and P-light and the reflected yellow fluorescent light into white light and emits the white light.

In this embodiment, the S-light is a light vector perpendicular to the incident surface, and the P-light is a light vector parallel to the incident surface (in other implementations, the P-light may be used as a light vector perpendicular to the incident surface and the S-light is designed as a light vector parallel to the incident surface). The beamsplitter 304 is made of glass. The reflectance of the beamsplitter to the excitation light may be obtained according to the Fresnel formula. In this embodiment, $\theta_1$ is the incident angle, $\theta_2$ is the refraction angle, $n_1$ is the air refractive index, and $n_1$ is the refractive index of the splitter. According to the Fresnel formula, expressions of the reflectance $R_S$ and the refractive index $T_S$ of the polarized light perpendicular to the incident surface (i.e., the S-light) are as follows:

$$Rs = \frac{\sin^2(\theta_1 - \theta_2)}{\sin^2(\theta_1 + \theta_2)} \quad (1)$$

$$Ts = \frac{n_2 \cos\theta_2}{n_1 \cos\theta_1} \cdot \frac{4\sin^2\theta_2 \cos^2\theta_1}{\sin^2(\theta_1 + \theta_2)}$$

Expressions of the reflectance $R_p$ and the refractive index $T_p$ of the polarized light parallel to the incident surface (i.e., the P-light) are as follows:

$$Rp = \frac{\tan^2(\theta_1 - \theta_2)}{\tan^2(\theta_1 + \theta_2)} \quad (2)$$

$$Tp = \frac{n_2 \cos\theta_2}{n_1 \cos\theta_1} \cdot \frac{4\sin^2\theta_2 \cos^2\theta_1}{\sin^2(\theta_1 + \theta_2)\cos^2(\theta_1 - \theta_2)}$$

Hence, the light vector of the incident light is associated with factors such as the refractive index of the splitter, the air refractive index, and the incident angle. In this embodiment, the specifically obtained reflectance $R_S$ of the first surface 3041 of the beamsplitter is 9% for the S-light, and the reflectance $R_p$ is 2% for the P-light. In other implementations, because specific values of relevant parameters are different, the reflectances for the S-light and the P-light of the beamsplitter may be in other values. A person skilled in the art may flexibly and reasonably design the proportions of the transmission and the reflection of the excitation light according to actual needs, so as to control the proportion when merging the light transmitted by the spectral filter unit and the excited light to obtain the final desired light.

Embodiment 4

Figure 4:
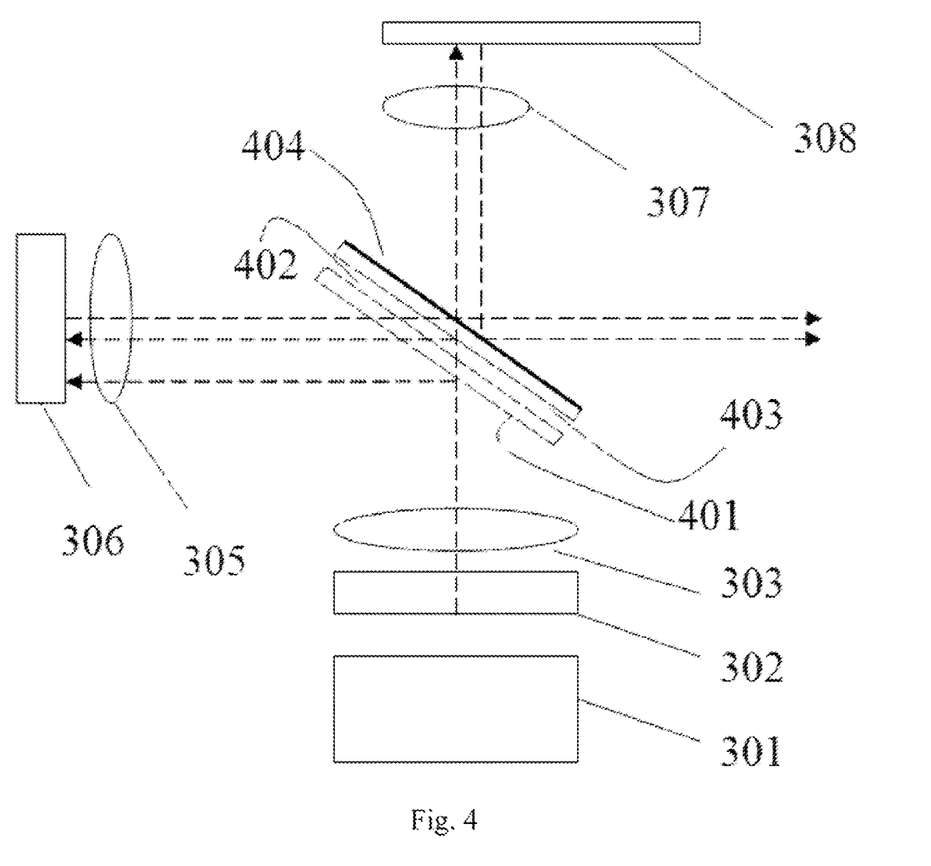
FIG. 4 is a schematic structural diagram of a light source system structure according to Embodiment 4 of the present disclosure.

As shown in FIG. 4, a light source system in this embodiment also includes a laser light source 301, a liquid crystal device 302, a relay lens 303, a spectral filter unit, a first collective lens 305, a diffuser 306, a second collective lens 307, and a reflective color wheel 308.

To meet the requirements for different proportions of the blue light and the yellow light, one can increase the quantity of the beamsplitter. A difference between this embodiment and the above embodiments is that the spectral filter unit of this embodiment includes multiple splitters, and a second surface of at least one of the splitters is coated with a film for transmitting the P-light and reflecting the excited light. Preferably, the film is coated on the second surface of the beamsplitter closest to the excited-light unit. In FIG. 3, the quantity of the beamsplitter is specifically two, and a surface 404 is coated with a film for transmitting the P-light and reflecting the excited light. Parts of a surface 401, a surface 402, and a surface 403 are coated with a film for reflecting the S-light and transmitting the P-light. If two surfaces among the surfaces are not coated with a film and another surface is coated with an AR film, the reflectance is about 18% for the S-light. If the three surfaces are not coated with a film, the reflectance is about 27% for the S-light, and so on. In combination with the deflection angle of the liquid crystal device 302, any reflectance between 2% to 27% of the excitation light can be achieved.

Other technical solutions of this embodiment may use principles that are consistent with those of the above embodiments, and the details are not described herein again.

Embodiment 5

Figure 5:
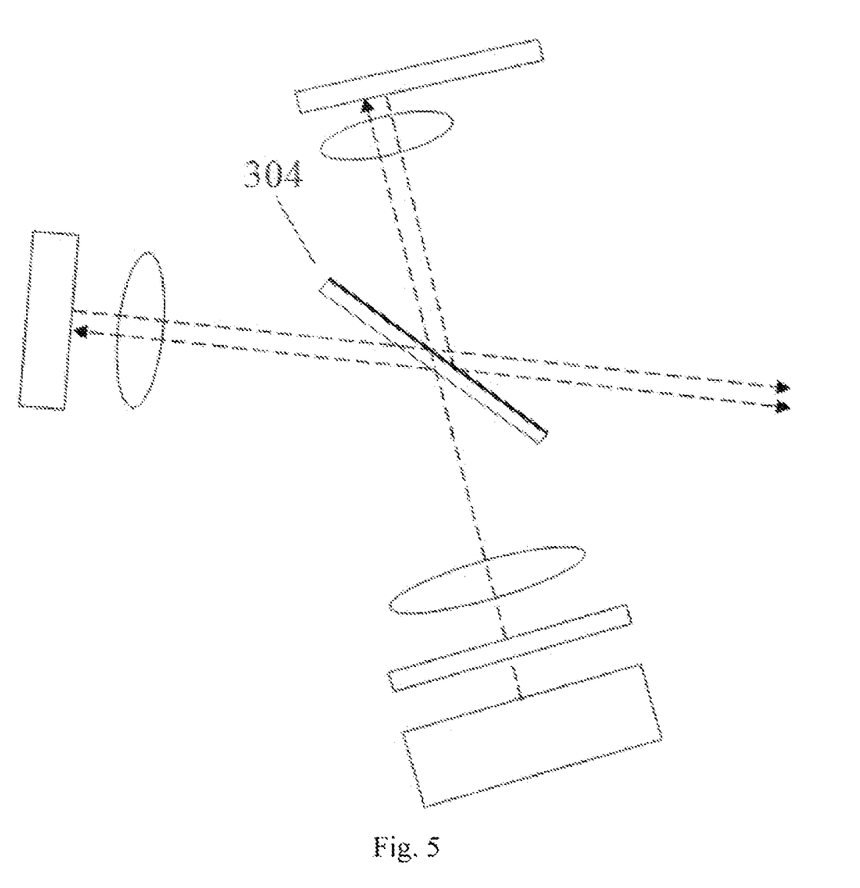
FIG. 5 is a schematic structural diagram of a light source system structure according to Embodiment 5 of the present disclosure.

In the above embodiments, to facilitate the design and preparation, an incident angle between the excitation light emitted by the excitation light unit and the beamsplitter 304 is 45°, so that the incident excitation light is perpendicular to the emitted white light. As shown in FIG. 5, the difference between this embodiment and the above embodiments is that an incident angle between the excitation light in this embodiment and the beamsplitter 304 is not equal to 45°, which may be greater than 45° or less than 45°. Such a design may meet some special structural needs. Other technical solutions of this embodiment may use principles that are consistent with those of the above embodiments, and the details are not described herein again.

Embodiment 6

Figure 6:
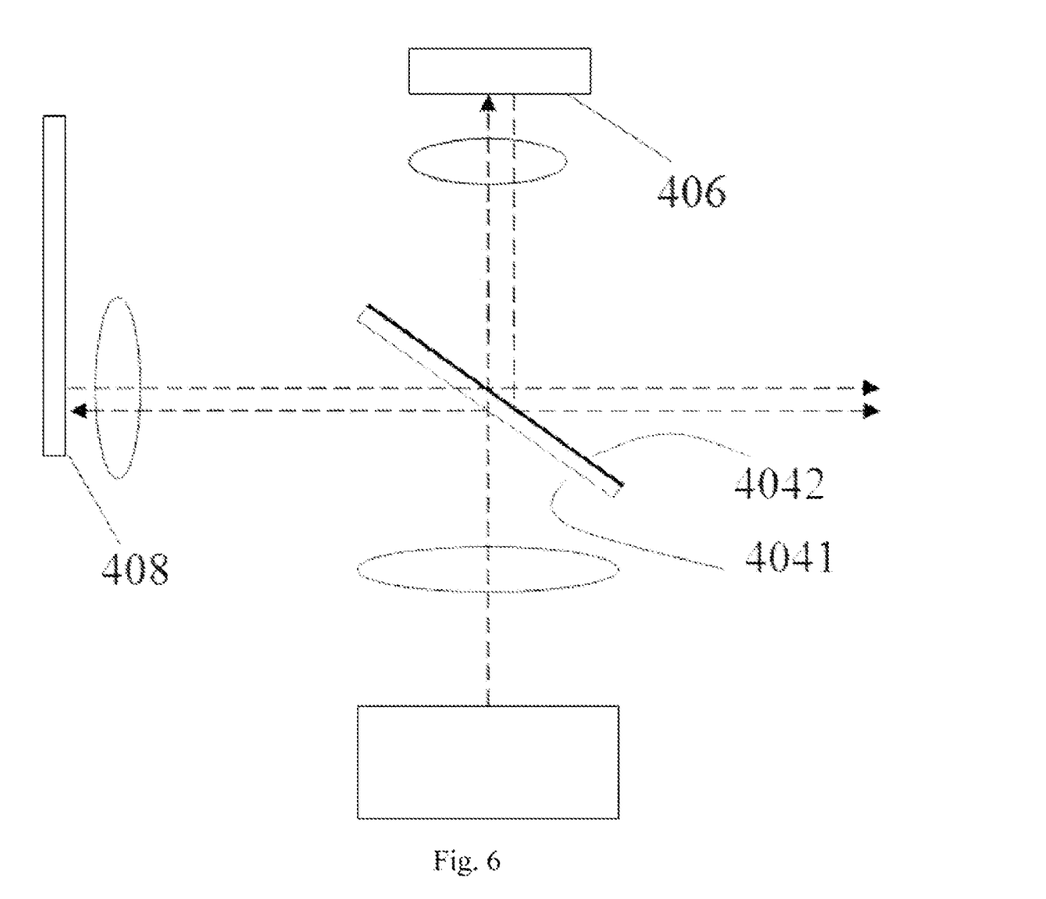
FIG. 6 is a schematic structural diagram of a light source system structure according to Embodiment 6 of the present disclosure.

As shown in FIG. 6, this embodiment includes an optical path structure derived from the Embodiment 1. A second surface 4042 of a beamsplitter in this embodiment is coated with a film for reflecting P-light and transmitting excited light, and a first surface 4041 is not coated with a film.

An excitation light unit emits S-light to a spectral filter unit, and the first surface 4041 of the beamsplitter transmits a portion of the S-light to a scattering unit. A diffuser 406 of the scattering unit performs Lambert scattering on the portion of the S-light so as to produce the S-light and the P-light that have the same proportion and emits the light to a spectral filter unit. The beamsplitter reflects the P-light thereof.

The first surface 4041 and the second surface 4042 of the beamsplitter also reflect another portion of the S-light to the excited-light unit. A color wheel 408 of the excited-light unit produces yellow fluorescent light under illumination of the another portion of the S-light and emits the yellow fluorescent light to the spectral filter unit. The second surface 4042 of the beamsplitter transmits the yellow fluorescent light.

Therefore, the spectral filter unit merges the reflected P-light and the transmitted yellow fluorescent light into white light and emits the white light.

Embodiment 7

Figure 7:
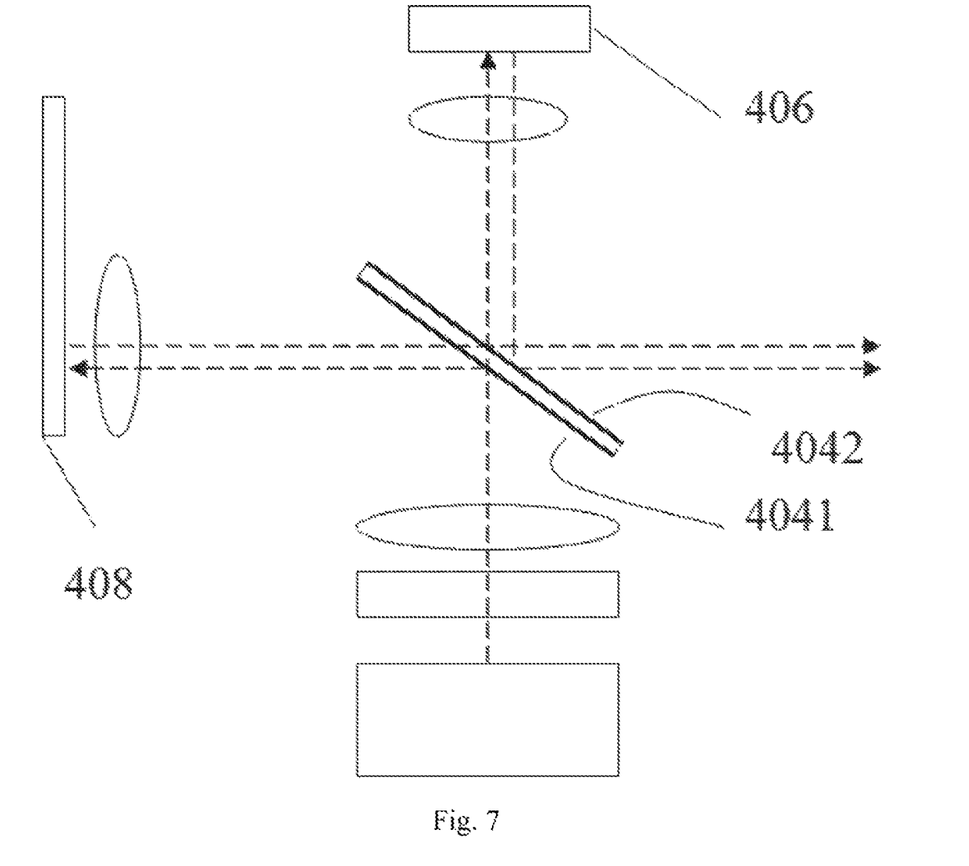
FIG. 7 is a schematic structural diagram of a light source system structure according to Embodiment 7 of the present disclosure.

As shown in FIG. 7, this embodiment includes an optical path structure derived from Embodiment 2. A first surface 4041 of a beamsplitter of this embodiment is coated with a film for transmitting S-light and reflecting P-light, and a second surface 4042 is coated with a film for reflecting the P-light and transmitting excited light.

An excitation light unit emits S-light and P-light that have a specific proportional relationship to the spectral filter unit. The beamsplitter transmits the S-light from the excitation light unit to the scattering unit. A diffuser 406 of the scattering unit performs Lambert scattering on the S-light so as to produce S-light and P-light that have the same proportion, and emits the light to the spectral filter unit. A second surface 4042 of the beamsplitter reflects the P-light.

The first surface 4041 of the beamsplitter reflects the P-light from the excitation light unit to the excited-light unit. The color wheel 408 of the excited-light unit produces yellow fluorescent light under illumination of the P-light, and emits the yellow fluorescent light to the spectral filter unit. The beamsplitter transmits the yellow fluorescent light.

Therefore, the spectral filter unit merges the reflected P-light and the transmitted yellow fluorescent light into white light and emits the white light.

In the light source system, the projection device, and the lighting device using the same that are provided by the present disclosure, the excitation light produced by an excitation light unit is divided into two paths at a spectral filter unit, and an output white light is finally emitted after merging the excitation light and the excited light. Since only one laser source is used, the design of the optical path structure is greatly simplified. In the present disclosure, the polarization principle is used to split the excitation light, so that the same excitation light can be effectively split without including different light components in the excitation light. In the present disclosure, a liquid crystal device may be adjusted, and the proportions of the S-light and the P-light may be allocated according to different requirements, so that the finally emitted white light is obtained by merging the P-light and the fluorescent light according to a predetermined proportion, which may satisfy various design requirements based on specific needs. The disclosure allows flexibility and variation of designs depending on whether the beamsplitter is coated, the quantity of the beamsplitter, and the combinations therefrom. The disclosure provides increased accuracy in controlling the proportion of the S-light and the P-light after passing through the spectral filter unit, and thus the finally emitted white light can meet different requirements. The design of the present disclosure exhibits numerous advantages and has important practical application values in the fields of beam illumination and 3LCD projection technology.

The above content is a further detailed description of the present disclosure with reference to specific embodiments. It should not be considered that the specific embodiments of the present disclosure are limited by these illustrated implementations. A person of ordinary skill in the art can further make simple deductions or substitutions without departing from the concept.

Thus, aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light source system, comprising:
an excitation light unit,
a spectral filter unit,
a scattering unit, and
an excited-light unit, wherein:
the excitation light unit is configured to emit excitation light to the spectral filter unit;
the spectral filter unit is configured to reflect or transmit a portion of the excitation light from the excitation light unit to the scattering unit;
the scattering unit is configured to scatter the portion of the excitation light to produce a first light having a first polarization state and a second light having a second polarization state, and emit the first light and second light to the spectral filter unit;
the spectral filter unit is configured to transmit or reflect the second light from the scattering unit;
the spectral filter unit is further configured to transmit or reflect another portion of the excitation light from the excitation light unit to the excited-light unit, and the excited-light unit produces excited light under illumination of the another portion of the excitation light and emits the excited light to the spectral filter unit;
the spectral filter unit is further configured to reflect or transmit the excited light from the excited-light unit, so that the spectral filter unit merges and emits the transmitted second light and the reflected excited light therefrom, or merges and emits the reflected second light and the transmitted excited light therefrom;
the spectral filter unit comprises a plurality of beamsplitters, each beamsplitter of the plurality of beamsplitters having a first surface facing the excitation light unit and the scattering unit, and a second surface facing the excited-light unit; and
at least one of the first surfaces of the plurality of beamsplitters is not coated with a film while the second surface of at least one beamsplitter of the plurality of beamsplitters is coated with a film for transmitting the second light and reflecting the excited light, or is coated with a film for reflecting the second light and transmitting the excited light.

2. The light source system according to claim 1, wherein:
the excitation light unit comprises a laser light source and a relay lens;
the laser light source is configured to emit laser, and the relay lens is configured to perform light processing on the laser emitted by the laser light source so as to emit the light-processed laser to the spectral filter unit as the excitation light;
the scattering unit comprises a diffuser and a first collective lens, and the spectral filter unit is configured to reflect or transmit the portion of the excitation light from the excitation light unit to the diffuser;
the first collective lens is configured to converge the portion of the excitation light that is reflected or transmitted by the spectral filter unit to the diffuser;
the diffuser is configured to perform Lambert scattering on the portion of the excitation light so as to produce the first light and the second light, and the first light and second light is emitted to the spectral filter unit via the first collective lens; and
the excited-light unit comprises a second collective lens and a phosphor device, and the spectral filter unit is configured to transmit or reflect the another portion of the excitation light from the excitation light unit to the phosphor device,
wherein the second collective lens is configured to converge the another portion of the excitation light that is transmitted or reflected by the spectral filter unit to the phosphor device, the phosphor device produces the excited light under illumination of the another portion of the excitation light, and the excited light is emitted to the spectral filter unit via the second collective lens.

3. The light source system according to claim 2, wherein the phosphor device is a reflective color wheel.

4. The light source system according to claim 2, wherein:
the excitation light unit further comprises a liquid crystal device disposed on an optical path between the laser light source and the relay lens;
the liquid crystal device is configured to adjust a polarization state of the laser; and
the laser emitted by the laser light source passes through the liquid crystal device to form the first light having the first polarization state and the second light having the second polarization state, wherein the first light and second light have a specific proportional relationship and are emitted to the spectral filter unit via the relay lens.

5. The light source system according to claim 4, wherein the first light is S-light, and the second light is P-light.

6. The light source system according to claim 1, wherein at least one beamsplitter of the plurality of beamsplitters is arranged such that the excitation light is incident on the beamsplitter at an incident angle of 45°.

7. The light source system according to claim 1, wherein the first surface of at least one beamsplitter of the plurality of beamsplitters has a reflectance of 9% regarding the first light and a reflectance of 2% regarding the second light.

8. The light source system according to claim 1, wherein some of the first or second surfaces of the plurality of beamsplitters except the second surface which is coated with a film for transmitting the second light and reflecting the excited light, or is coated with a film for reflecting the second light and transmitting the excited light, are coated with a film for reflecting the first light and transmitting the second light, or are coated with a film for transmitting the first light and reflecting the second light.

9. The light source system according to claim 1, wherein, for at least one beamsplitter of the plurality of beamsplitters:
the excitation light emitted by the excitation light unit to the spectral filter unit is the first light having the first polarization state;
the first surface is configured to reflect or transmit a portion of the first light to the scattering unit; and
the first surface and the second surface are configured to transmit or reflect another portion of the first light to the excited-light unit so as to excite the excited-light unit to produce the excited light.

10. The light source system according to claim 1, wherein, for at least one beamsplitter of the plurality of beamsplitters:
the excitation light emitted by the excitation light unit to the spectral filter unit is the first light having the first polarization state and the second light having the second polarization state; and
the first surface is coated with a film for reflecting the first light and transmitting the second light, the first surface is configured to reflect the first light to the scattering unit, the first surface and the second surface are configured to transmit the second light to the excited-light unit, and the excited-light unit produces the excited light under illumination of the second light, or
the first surface is coated with a film for transmitting the first light and reflecting the second light, the first surface is configured to transmit the first light to the scattering unit, the first surface and the second surface are configured to reflect the second light to the excited-light unit, and the excited-light unit produces the excited light under illumination of the second light.

11. The light source system according to claim 1, wherein, for at least one beamsplitter of the plurality of beamsplitters:
the excitation light emitted by the excitation light unit to the spectral filter unit is the first light having the first polarization state and the second light having the second polarization state;
the first surface is configured to reflect or transmit a portion of the first light and a portion of the second light to the scattering unit; and
the first surface and the second surface are configured to transmit or reflect another portion of the first light and another portion of the second light to the excited-light unit so as to excite the excited-light unit to produce the excited light.

12. A projection device comprising a light source, wherein the light source of the projection device is the light source system according to claim 1.

13. A lighting device comprising a light source, wherein the light source of the lighting device is the light source system according to claim 1.

14. The light source system according to claim 1, wherein at least one of surfaces of the plurality of beamsplitters is coated with an AR film.

15. The light source system according to claim 1, wherein the spectral filter unit is arranged such that the excitation light is incident on the spectral filter unit at an incident angle that is greater than 45°.

16. The light source system according to claim 1, wherein a first surface of a beamsplitter that is closest to the excitation light unit and the scattering unit is not coated with a film.

17. The light source system according to claim 1, wherein the spectral filter unit comprises a first beamsplitter and a second beamsplitter, the first beamsplitter being closer than the second beamsplitter from the excitation light unit;

wherein the first surfaces of the first and second beamsplitters are not coated with a film, and the second surface of at least one of the first and second beamsplitters is coated with a film for transmitting the second light and reflecting the excited light, or is coated with a film for reflecting the second light and transmitting the excited light.

18. The light source system according to claim 1, wherein the excitation light emitted from the excitation light unit to the spectral filter unit has single polarization state.

19. The light source system according to claim 1, wherein the plurality of beamsplitters are separated from each other.

20. The light source system according to claim 1, wherein a number of the first surfaces without a film plus a number of the second surfaces without a film is substantially proportional to a reflectance of the spectral filter unit under a condition that the plurality of the beamsplitters are parallel to each other.

* * * * *